(12) United States Patent
Endo et al.

(10) Patent No.: US 11,345,044 B2
(45) Date of Patent: May 31, 2022

(54) TORQUE SENSOR SUPPORTING DEVICE

(71) Applicant: NIDEC COPAL ELECTRONICS CORPORATION, Tokyo (JP)

(72) Inventors: Takayuki Endo, Sano (JP); Takashi Suzuki, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/138,294

(22) Filed: Dec. 30, 2020

(65) Prior Publication Data

US 2021/0114230 A1 Apr. 22, 2021

Related U.S. Application Data

(63) Continuation of application No. PCT/JP2019/018143, filed on Apr. 26, 2019.

(30) Foreign Application Priority Data

Jul. 2, 2018 (JP) .............................. JP2018-126141

(51) Int. Cl.
*G01L 3/14* (2006.01)
*B25J 13/08* (2006.01)
(Continued)

(52) U.S. Cl.
CPC ............... *B25J 13/085* (2013.01); *G01L 3/14* (2013.01); *G01L 5/0061* (2013.01); *G01D 11/02* (2013.01); *G01D 11/30* (2013.01)

(58) Field of Classification Search
CPC .......... B25J 13/025; G01L 3/14; G01D 11/02; G01D 11/30
See application file for complete search history.

(56) References Cited

U.S. PATENT DOCUMENTS 4,754,652 A 7/1988 Coulter et al.
2007/0283767 A1 12/2007 Watanabe et al.
(Continued)

FOREIGN PATENT DOCUMENTS

CN 101865275 10/2010
CN 102235926 11/2011
(Continued)

OTHER PUBLICATIONS

International Search Report for International Application PCT/JP2019/018143, dated May 28, 2019.
(Continued)

*Primary Examiner* — Jamel E Williams
(74) *Attorney, Agent, or Firm* — Burris Law, PLLC

(57) ABSTRACT

A torque sensor supporting device capable of preventing bending moment other than torque from occurring to a torque sensor and improving the detection accuracy of the torque sensor. A first supporting body is provided to a base serving as a first mounting section of a robot. A second supporting body is coupled to a second structure of a torque sensor including a first structure provided to the base, the second structure coupled to a first arm serving as a second mounting section, third structures provided between the first structure and the second structure, and at least two sensor sections provided between the first structure and the second structure. Rotating bodies are provided between the first supporting body and the second supporting body.

16 Claims, 4 Drawing Sheets

(51) Int. Cl.
  *G01L 5/00*   (2006.01)
  *G01D 11/02*   (2006.01)
  *G01D 11/30*   (2006.01)

(56) References Cited

U.S. PATENT DOCUMENTS

| | | |
|---|---|---|
| 2010/0005907 A1 | 1/2010 | Kato et al. |
| 2011/0239788 A1 | 10/2011 | Nagasaka et al. |
| 2013/0257230 A1 | 10/2013 | Park et al. |
| 2015/0323398 A1 | 11/2015 | Lauzier et al. |
| 2017/0241761 A1 | 8/2017 | Kosaka et al. |

FOREIGN PATENT DOCUMENTS

| | | |
|---|---|---|
| CN | 103620372 | 3/2014 |
| CN | 103890386 | 6/2014 |
| CN | 204239655 | 4/2015 |
| CN | 105074408 | 11/2015 |
| CN | 204831658 | 12/2015 |
| JP | 05223665 A * | 8/1993 |
| JP | H05223665 | 8/1993 |
| JP | 2000136974 | 5/2000 |
| JP | 2005069402 | 3/2005 |
| JP | 2010169586 | 8/2010 |
| JP | 2013096735 | 5/2013 |
| JP | 2015049209 | 3/2015 |
| JP | 2016105070 | 6/2016 |
| JP | 2017172983 | 9/2017 |
| JP | 2018091813 | 6/2018 |
| WO | 2012070285 | 5/2012 |

OTHER PUBLICATIONS

English Translation of Submission of Publication of corresponding JP Application 2018-126141, dated Dec. 2, 2020.
Office Action issued in corresponding CN Application 201980044020 X, dated Dec. 2, 2021 and an English translation thereof.
Extended European Search Report issued in corresponding EP Application 19830849.6, dated Feb. 21, 2022.

* cited by examiner

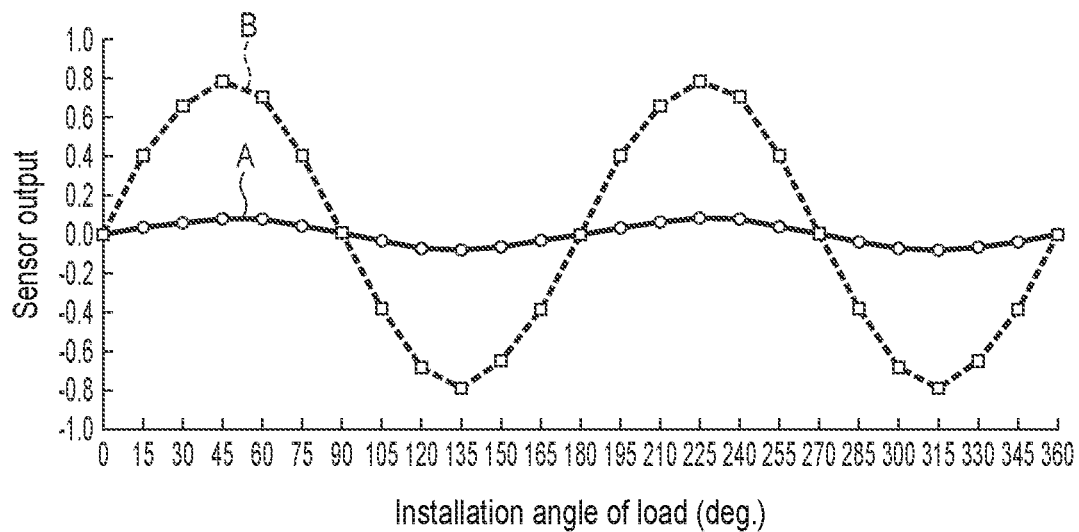
F I G. 5
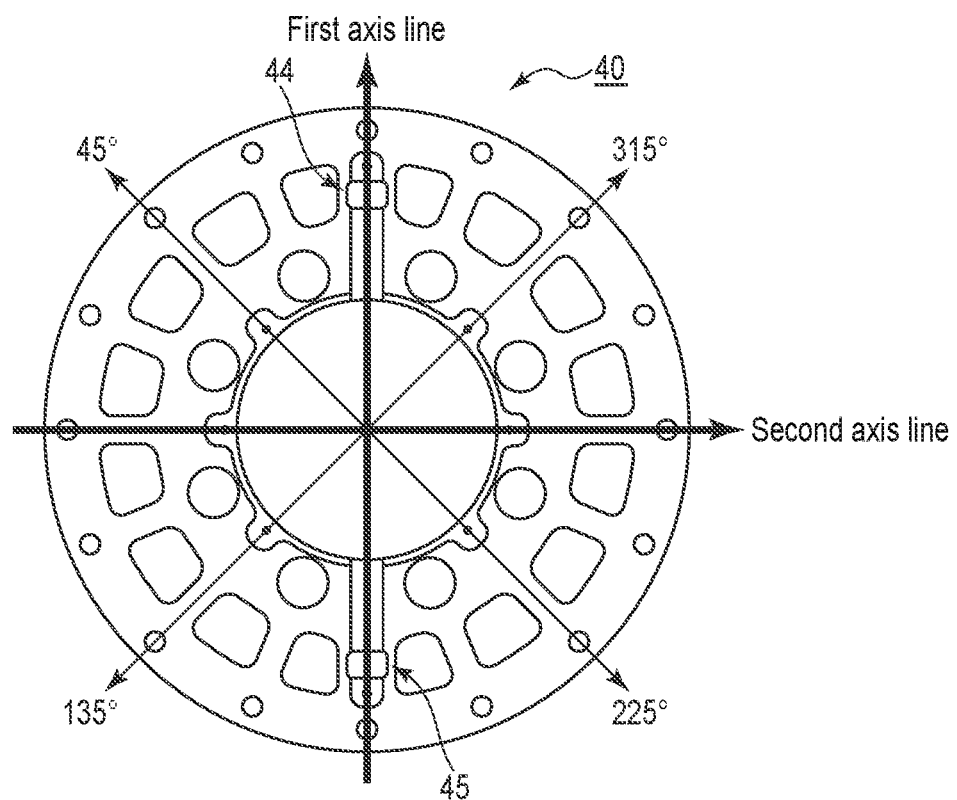
F I G. 6

TORQUE SENSOR SUPPORTING DEVICE

CROSS-REFERENCE TO RELATED APPLICATIONS

This application is a continuation of International Application No. PCT/JP2019/018143, filed on Apr. 26, 2019, which claims priority to and the benefit of Japanese Patent Application No. 2018-126141, filed on Jul. 2, 2018. The disclosures of the above applications are incorporated herein by reference.

FIELD

The present disclosure relates to a torque sensor to be applied to, for example, a robot arm or the like, and relate further to a supporting device configured to support the torque sensor.

BACKGROUND

A torque sensor includes a first structure to which torque is applied, a second structure from which torque is output, and a plurality of strain sections serving as beams connecting the first structure and the second structure, and a plurality of strain gauges serving as sensor elements are arranged on the strain sections. A bridge circuit is constituted by these strain gauges (cf., for example, Patent Literature 1 (JP 2013-096735 A), Patent Literature 2 (JP 2015-049209 A) and Patent Literature 3 (JP 2017-172983 A)).

In a torque amount converter which measures a torque generated in an output unit of an engine, etc., of an automobile, a technique for reducing an influence of a bending stress other than torque has been developed (cf., for example, Patent Literature 4 (JP 2010-169586 A)).

SUMMARY

When a disk-shaped torque sensor is used by fixing the first structure thereof to, for example, a base of a robot arm (hereinafter simply referred to as an arm) and fixing the second structure thereof to, for example, a drive unit of the arm, a bending moment accompanying the transfer weight of the arm, distance to the load (distance from the center of the torque sensor to the object to be carried), and acting acceleration (moment of inertia of the arm and load) is applied to the torque sensor.

In general, when, for example, two strain sections (hereinafter also referred to as strain bodies) are arranged in the diametrical direction of a disk-shaped torque sensor and there are loads which present on both sides of a first axis line passing through the two strain sections and which are equal and opposite in direction to each other, bending moment is applied to the torque sensor. However, only symmetrical strains are created in the two strain bodies, and hence the sensor output associated with the bending moment to be applied to the torque sensor becomes theoretical zero. That is, the torque sensor is not subjected to interferences from other axes (hereinafter referred to as other-axes interferences) other than the torque. When similar loads are present on a second axis line perpendicular to the first axis line or even when the similar loads are present at positions on a line diagonally intersecting the first axis line and second axis line, the torque sensor is theoretically not subjected to the other-axes interferences.

Further, in the case where the force application point (or working point) is present on one side of the diametrical direction of the torque sensor with respect to the center of the torque sensor, when the load is present at a position of 0° or 180° on the first axis line and when the load is present at a position of 90° or 270° on the second axis line, although bending moment is applied to the torque sensor, the bending moment is cancelled by the two strain bodies. For this reason, the torque sensor is not subjected to other-axes interferences and the sensor output becomes zero.

When the torque sensor is to be utilized for the robot arm, one end of the arm is fixed to the torque sensor side, and the other end thereof is present at a position separate from the torque sensor. That is, when the fulcrum is on the torque sensor side, the force application point (or working point) acting as the load is present at a position separate from the fulcrum. Moreover, the positions of the loads are not always present on the two axis lines passing through the center of the disk-shaped torque sensor and perpendicular to each other. Accordingly, the torque sensor is subjected to the other-axes interferences attributable to the bending moment. In this case, particularly with respect to a load at a position deviated from the first axis line and second axis line by 45°, large other-axes interferences occur. More specifically, a peak of the sensor output occurs at each of 45°, 135°, 225°, and 315° of the rotational angle of the arm. When the sensor output is assumed to be a sinusoidal wave, two peaks occur during one period, and hence the peaks are called f2 components.

As described above, due to the fact that the bending moment other than the torque occurs in the torque sensor, and by the other-axes interferences, the f2 components occur. For this reason, the detection accuracy of the torque sensor has been lowered.

Embodiments described herein aim to provide a torque sensor supporting device capable of preventing bending moment other than torque from occurring to a torque sensor and improving the detection accuracy of the torque sensor.

A torque sensor supporting device of this embodiment comprises a first structure, a second structure, third structures provided between the first structure and the second structure, and at least two sensor sections provided between the first structure and the second structure, and the torque sensor supporting device comprises a first mounting section provided to the first structure, a second mounting section which is coupled to the second structure and to which torque is applied, a first supporting body provided to the first mounting section, a second supporting body linked with the second structure and a plurality of rotating bodies provided between the first supporting body and the second supporting body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 is a view showing a relationship between a rotational angle of the robot arm and sensor output and is a view showing a comparison between the embodiment and comparison example.

FIG. 6 is a view shown for explaining the bending moment occurring to the torque sensor.

DETAILED DESCRIPTION

Embodiments of the present invention will be described below with reference to the accompanying drawings. Elements like or similar to those disclosed in the above embodiments are denoted by similar reference numbers.

First, a robot arm 30 and torque sensor 40 to which the embodiment is applied will be described below with reference to FIG. 3 and FIG. 4.

Figure 3:
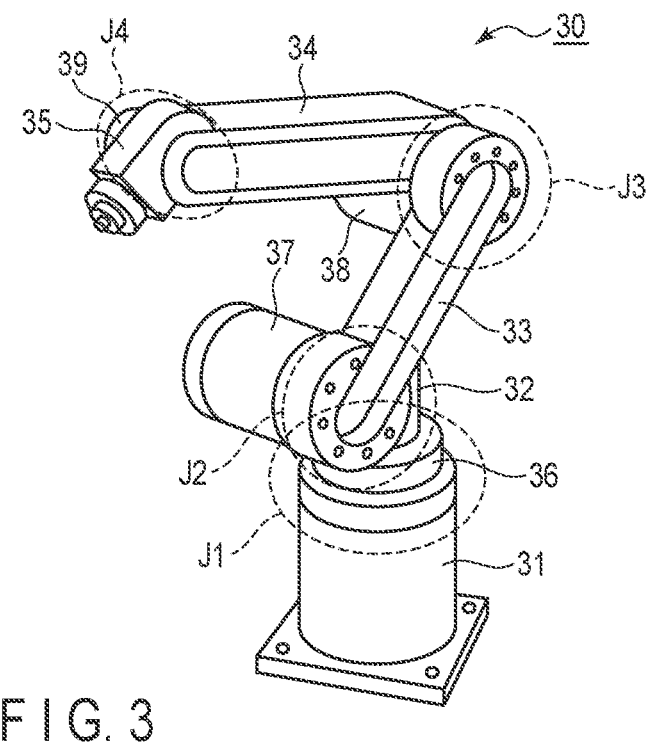
FIG. 3 is a perspective view showing an example of a robot arm to which the embodiments are to be applied.

FIG. 3 shows an example of an articulated robot, i.e., the robot arm 30. The robot arm 30 comprises, for example, a base 31, a first arm 32, a second arm 33, a third arm 34, a fourth arm 35, a first drive unit 36 serving as a drive source, a second drive unit 37, a third drive unit 38, and a fourth drive unit 39. However, the configuration of the robot arm 30 is not limited to this and is modifiable.

The first arm 32 is provided to be rotatable relative to the base 31 by the first drive unit 36 provided to a first joint J1. The second arm 33 is provided to be rotatable relative to the first arm 32 by the second drive unit 37 provided to a second joint J2. The third arm 34 is provided to be rotatable relative to the second arm 33 by the third drive unit 38 provided to a third joint J3. The fourth arm 35 is provided to be rotatable relative to the third arm 34 by the fourth drive unit 39 provided to a fourth joint J4. A hand and various tools (not shown) are mounted on the fourth arm 35.

Each of the first drive unit 36 to the fourth drive unit 39 comprises, for example, a motor, a speed reducer, and a torque sensor, which will be described later.

Figure 4:
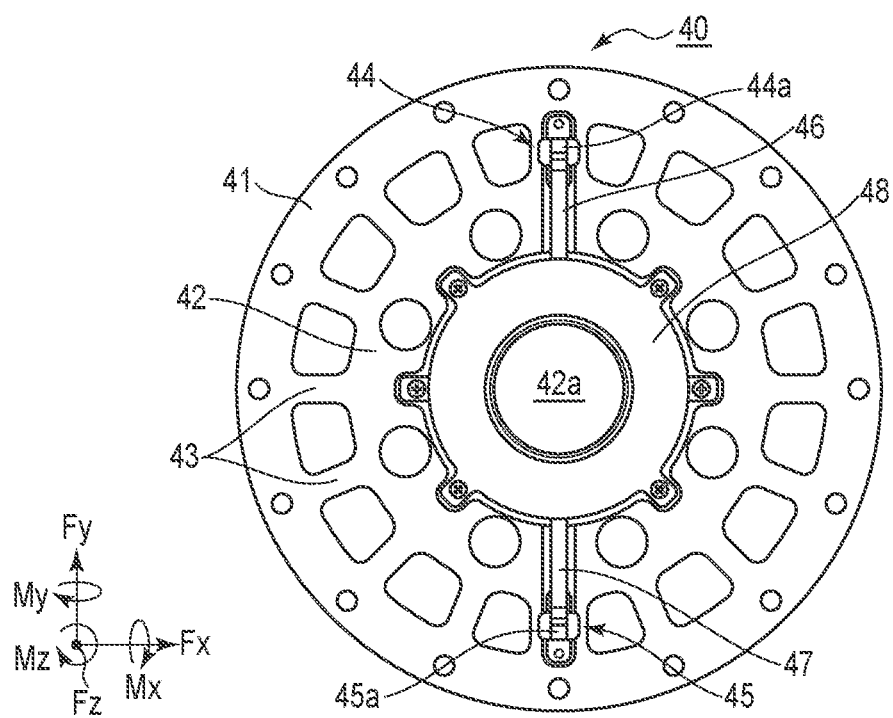
FIG. 4 is a plan view showing an example of a torque sensor to which the embodiments are to be applied.

FIG. 4 shows an example of the disk-shaped torque sensor 40 to be applied to this embodiment. The torque sensor 40 comprises a first structure 41, second structure 42, plurality of third structures 43, first strain sensor 44 and second strain sensor 45 both constituting a sensor section, and the like.

Both the first structure 41 and second structure 42 are formed annular, and the diameter of the second structure 42 is smaller than the diameter of the first structure 41. The second structure 42 is arranged concentric with the first structure 41, and first structure 41 and second structure 42 are coupled to each other by the third structures 43 serving as a plurality of radially arranged beams. The plurality of third structures 43 transmits torque between the first structure 41 and second structure 42. The second structure 42 includes a hollow section 42a and, for example, wiring (not shown) is passed through the hollow section 42a.

Although the first structure 41, second structure 42, and plurality of third structures 43 are constituted of a metal, for example, stainless steel, materials other than the metal can also be used if mechanical strength sufficient to withstand the applied torque can be obtained. The first structure 41, second structure 42, and plurality of third structures 43 all have, for example, the same thickness. The mechanical strength of the torque sensor 40 is set according to the thickness, width, and length of the third structure 43.

Between the first structure 41 and second structure 42, the first strain sensor 44 and second strain sensor 45 are provided. More specifically, one ends of a strain body 44a constituting the first strain sensor 44 and strain body 45a constituting the second strain sensor 45 are joined to the first structure 41, and the other ends of the strain bodies 44a and 45a are joined to the second structure 42. A thickness of each of the strain bodies 44a and 45a is less than the thickness of each of the first structure 41, second structure 42, and plurality of third structures 43.

On each of the surfaces of the strain bodies 44a and 45a, a plurality of strain gauges (not shown) serving as sensor elements is provided. A first bridge circuit is constituted of the sensor elements provided on the strain body 44a, and second bridge circuit is constituted of the sensor elements provided on the strain body 45a. That is, the torque sensor 40 is provided with two bridge circuits.

Further, the first strain sensor 44 and second strain sensor 45 are arranged at positions symmetrical with respect to the center (action center of torque) of each of the first structure 41 and second structure 42. In other words, the first strain sensor 44 and second strain sensor 45 are arranged on the diameter of each of the annular first structure 41 and second structure 42.

The first strain sensor 44 (strain body 44a) is connected to a flexible wiring board 46 and second strain sensor 45 (strain body 45a) is connected to a flexible wiring board 47. The flexible wiring boards 46 and 47 are connected to a printed-wiring board (not shown) covered with a cover 48. On the printed-wiring board, operational amplifiers and the like configured to amplify output voltages of the two bridge circuits are arranged. The circuit configuration is not the nature of this embodiment, and hence a description thereof is omitted.

In this embodiment, the torque sensor 40 is deformed with respect to torque (Mz), and its deformation with respect to a bending moment other than torque (Mx, My) is suppressed by a supporting device to be described later.

First Embodiment

Figure 1:
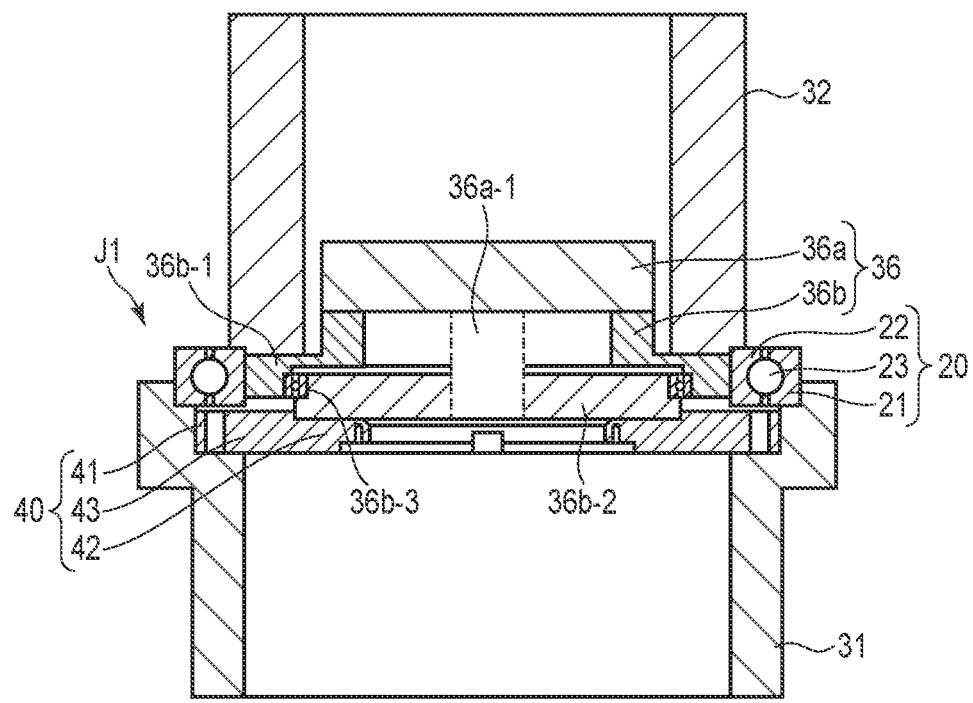
FIG. 1 is a cross-sectional view showing an example of a torque sensor supporting device according to a first embodiment.

FIG. 1 shows a first embodiment.

As shown in FIG. 1, in, for example, the first joint J1, the first drive unit 36, torque sensor 40, and rolling bearing functioning as a supporting device configured to support the torque sensor 40, for example, ball bearing (hereinafter referred to as a bearing) 20 are provided.

The torque sensor 40 is provided at an upper part of the base 31 serving as a first mounting section. More specifically, the first structure 41 of the torque sensor 40 is fixed to the upper part of the base 31 by means of a plurality of bolts not shown.

The first drive unit 36 is provided inside the first arm 32 serving as a second mounting section and on a first surface (top surface) of the torque sensor 40. The first drive unit 36 is constituted of, for example, a motor 36a, and speed reducer 36b. The speed reducer 36b comprises, for example, a case 36b-1, output shaft 36b-2, bearing 36b-3, plurality of gears and the like not shown. The output shaft 36b-2 is coupled to a shaft 36a-1 of the motor 36a through a plurality of gears not shown, and is provided rotatable relatively to the case 36b-1 by the bearing 36b-3.

The second structure 42 of the torque sensor 40 is fixed to the output shaft 36b-2 of the speed reducer 36b by means of a plurality of bolts not shown. The case 36b-1 of the speed reducer 36b is fixed to the first arm 32.

As shown in FIG. 1, the bearing 20 comprises an outer race 21 serving as a first supporting body, inner race 22 serving as a second supporting body, and plurality of balls 23 serving as third supporting bodies.

The bearing 20 is provided on the first surface (top surface) side of the torque sensor 40. The outer race 21 of the bearing 20 is fixed to the base 31, and inner race 22 is fixed to the case 36b-1 of the speed reducer 36b.

FIG. 1 shows the case where the so-called radial bearing is applied as the bearing 20. However, the bearing is not limited to this, and bearings of other configurations such as a thrust bearing and the like can also be applied.

Further, the third supporting body is not limited to the ball 23, and a rotating body such as a roller may also be used.

When the bearing receives force in a direction causing the inner race 22 to rotate relatively to the outer race 21, the inner race 22 is rotated relatively to the outer race 21. On the other hand, when the bearing 20 receives force in a direction other than the rotational direction, deformation thereof is suppressed by the stiffness possessed by the outer race 21, inner race 22, and balls 23.

The material for the ball 23 or roller functioning as a rotating body is a material containing iron, e.g., a steel material such as stainless steel or the like, cast iron or ceramic.

The number of the balls 23 or rollers functioning as the rotating bodies is greater than or equal to four, and the rotating bodies are arranged at equal intervals. These balls 23 or rollers are arranged on radii of the same length, respectively.

When the number of the rotating bodies is four, the rotating bodies are arranged at positions of 45°, 135°, 225°, and 315° with, for example, a first strain sensor 44 of the torque sensor 40 set as the criterion as shown in FIG. 6.

Further, the stiffness of the bearing 20 including the first supporting body 21, second supporting body 22, and ball 23 and functioning as the supporting device is greater than or equal to the stiffness of the third structures 43 of the torque sensor 40.

In the above configuration, when the speed reducer 36b is driven by the motor 36a, the inner race 22 of the bearing 20 rotates relatively to the outer race 21, and first arm 32 rotates. At the same time, torque (Mz) is applied from the speed reducer 36b to the torque sensor 40, and the second structure 42 of the torque sensor 40 is displaced in the torque (Mz) direction relatively to the first structure 41, whereby the torque is detected.

On the other hand, when the first to fourth arms 32 to 35 operate, and a bending moment other than the torque (Mx, My) is applied to the torque sensor 40 concomitantly with the transfer weight, distance to the load, and acting acceleration, in the bearing 20, deformation thereof is suppressed by the stiffness possessed by the outer race 21, inner race 22, and balls 23. For this reason, deformation of the speed reducer 36b is suppressed, and displacement of the second structure 42 relative to the first structure 41 of the torque sensor 40 is suppressed with respect to the bending moment other than the torque (Mx, My). Accordingly, in the torque sensor 40, output of a detection signal for the bending moment other than the torque (Mx, My) is suppressed.

(Advantages of First Embodiment)

According to the first embodiment described above, the outer race 21 of the bearing 20 functioning as the supporting device is fixed to the base 31 of the robot arm 30, the base 31 being the one to which the first structure 41 of the torque sensor 40 is fixed, and inner race 22 is fixed to both the speed reducer 36b to which the second structure 42 of the torque sensor 40 is fixed and first arm 32. Accordingly, displacement of the torque sensor 40 attributable to the bending moment other than the torque to be applied to the torque sensor 40 can be suppressed. Therefore, in the torque sensor 40, other-axes interferences can be suppressed and the accuracy of torque detection can be improved.

FIG. 5 is a view showing a relationship between a rotational angle (installation angle of the load) of the robot arm 30 relative to the base 31 and output signal of the torque sensor 40, and showing the case A of the first embodiment and case B of a comparative example having no bearing 20 functioning as the supporting device.

As in the case of the first embodiment where the torque sensor 40 is arranged inside, for example, the first joint J1 of the robot arm 30, the robot arm 30 is made 360°-rotatable around the torque sensor 40.

As shown in FIG. 6, when the load acting as the force application point (or working point) of the robot arm 30 moves in the first axis line passing through the first strain sensor 44 and second strain sensor 45 of the torque sensor 40 or when the load moves in the second axis line perpendicular to the first axis line, although bending moment occurs, as far as positions on these axis lines are concerned, the other-axes interferences become theoretically zero. However, when the load moves to a position other than the positions on the first axis line and second axis line, bending moment accompanying the transfer weight of the robot arm 30, distance to the load, and acting acceleration is caused to the torque sensor 40. Accordingly, when there is no bearing 20 according to the first embodiment, the torque sensor 40 is subjected to the other-axes interferences, and a sensor output of a high level occurs.

That is, as shown in FIG. 5 by B, when the load moves to a position deviated from the first axis line and second axis line, other-axes interferences are caused to the torque sensor 40, and a sensor output of a large peak occurs at each of 45°, 135°, 225°, and 315° of the rotational angle of the robot arm 30 with the first axis line set as the criterion.

Conversely, as in the case of the first embodiment where the bearing 20 is provided, it is possible to suppress the displacement of the torque sensor 40 caused by the force in the direction other than the torque applied to the torque sensor 40. Thereby, it is possible to suppress the other-axes interferences in the torque sensor 40, and hence it is possible to prevent a sensor output from being generated from the torque sensor 40 at each of 45°, 135°, 225°, and 315° with the first axis line set as the criterion as shown by A of FIG. 5. Accordingly, it is possible to improve the accuracy of torque detection to be carried out by the torque sensor 40.

Second Embodiment

Figure 2:
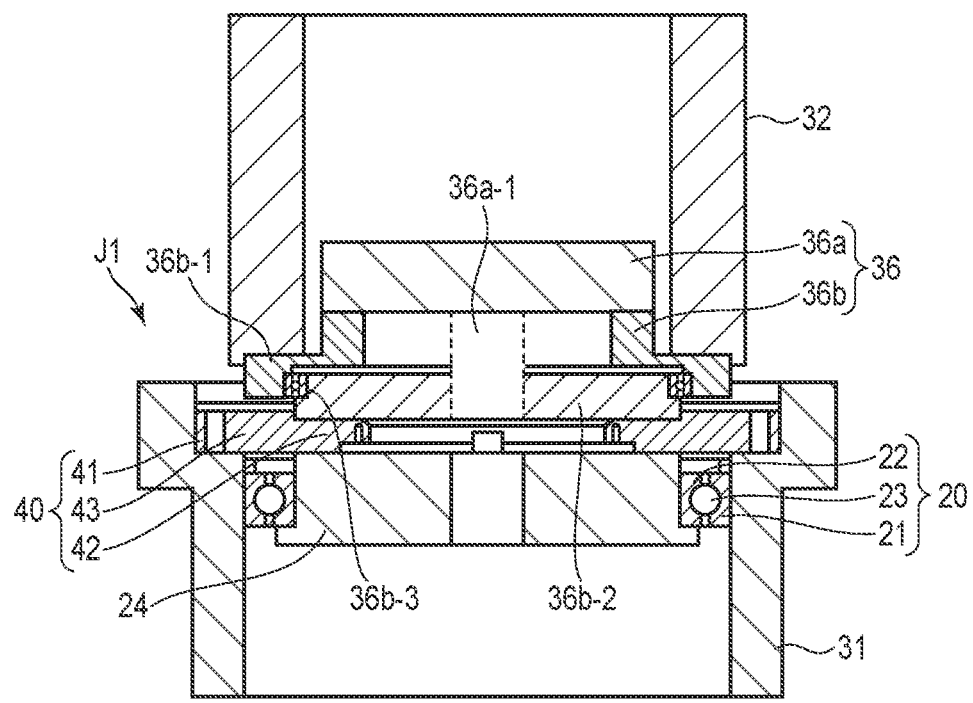
FIG. 2 is a cross-sectional view showing an example of a torque sensor supporting device according to a second embodiment.

FIG. 2 shows a second embodiment. The second embodiment is a modified example of the first embodiment. In the first embodiment, the bearing 20 functioning as the supporting device is provided on the first surface (top surface) side of the torque sensor 40, and between the base 31 and an aggregate of the speed reducer 36b and first arm 32. Conversely, in the second embodiment, the bearing 20 is provided on the second surface (rear surface) side of the torque sensor 40.

More specifically, the bearing 20 is provided on the second surface side of the torque sensor 40 through a fourth supporting body 24. The fourth supporting body 24 is a circular member having a diameter approximately equal to, for example, the second structure 42 of the torque sensor 40, and is constituted of a material identical to the torque sensor 40. The fourth supporting body 24 is fixed to the second structure 42 of the torque sensor 40 by means of, for example, bolts not shown.

The bearing 20 is provided between the circumference of the fourth supporting body 24 and inner surface of the base 31. That is, the inner race 22 of the bearing 20 is fixed to the circumference of the fourth supporting body 24, and outer race 21 is fixed to the inner surface of the base 31.

It should be noted that the bearing 20 is not limited to the radial bearing and, for example, bearings of other configurations such as a thrust bearing and the like can also be applied.

Further, the third supporting body is not limited to the ball 23 and, for example, a rotating body such as a roller may also be used.

In the configuration described above, when the speed reducer 36b is driven by the motor 36a, the first arm 32 rotates. At the same time, torque (Mz) is applied from the speed reducer 36b to the torque sensor 40, and the second structure 42 of the torque sensor 40 is displaced in the torque (Mz) direction relatively to the first structure 41 together with the fourth supporting body 24. That is, the fourth supporting body 24 is rotationally moved relatively to the base 31 through the bearing 20 together with the second structure 42. The second structure 42 of the torque sensor 40 is displaced in the torque (Mz) direction relatively to the first structure 41, whereby the torque is detected.

On the other hand, when the first to fourth arms 32 to 35 operate, and a bending moment other than the torque (Mx, My) is applied to the torque sensor 40 concomitantly with the transfer weight, distance to the load, and acting acceleration, displacement of the second structure 42 of the torque sensor 40 is suppressed by the fourth supporting body 24 and bearing 20. For this reason, the second structure 42 of the torque sensor 40 is prevented from being displaced relatively to the first structure 41. Accordingly, in the torque sensor 40, output of a detection signal for the bending moment other than the torque (Mx, My) is suppressed.

(Advantages of Second Embodiment)

According to the second embodiment, the fourth supporting body 24 and bearing 20 are provided on the second surface side of the torque sensor 40 and between the second structure 42 and base 31. For this reason, the torque sensor 40 can suppress other-axes interferences, and generation of a sensor output from the torque sensor 40 can be suppressed as shown by A of FIG. 5. Accordingly, it is possible to improve the accuracy of torque detection to be carried out by the torque sensor 40.

Moreover, the fourth supporting body 24 is provided between the second structure 42 of the torque sensor 40 and bearing 20, and hence it is possible to securely prevent the displacement of the torque sensor 40 from occurring with respect to the bending moment other than the torque (Mx, My) to be applied to the torque sensor 40.

Third Embodiment

In the first and second embodiments described above, the first structure 41 of the torque sensor 40 is coupled to the base 31, and second structure 42 is coupled to the output shaft 36b-2 of the speed reducer 36b. Conversely, in a third embodiment shown in FIG. 7, the first structure 41 of the torque sensor 40 is coupled to the output shaft 36b-2 of the speed reducer 36b, and second structure 42 is coupled to the base 31.

Figure 7:
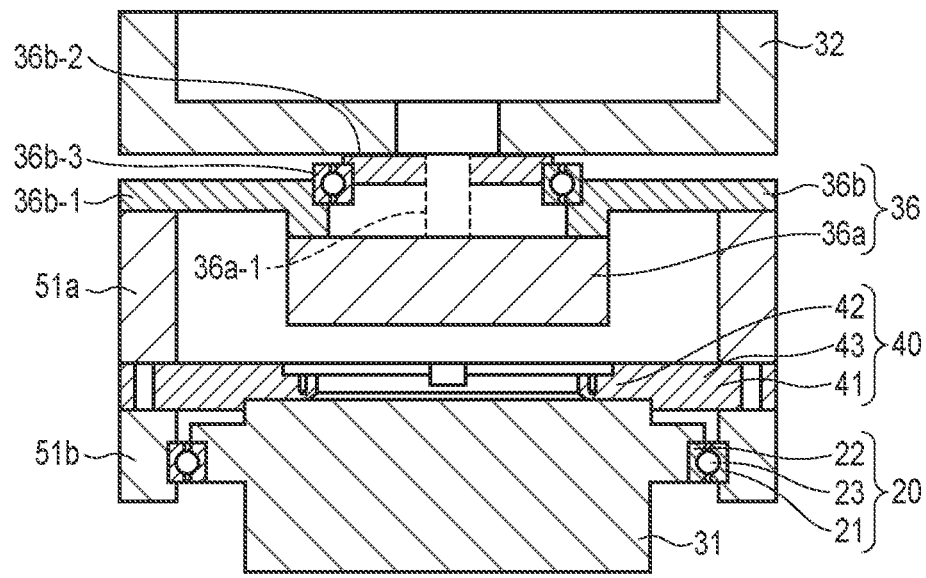
FIG. 7 is a cross-sectional view showing an example of a torque sensor supporting device according to a third embodiment.

In FIG. 7, for example, one end of a cylindrical attachment 51a is fixed to the first structure 41 of the torque sensor 40 by means of, for example, a plurality of bolts not shown. The case 36b-1 of the speed reducer 36b is fixed to the other end of the attachment 51a by means of, for example, a plurality of bolts not shown. The output shaft 36b-2 of the speed reducer 36b is provided to the case 36b-1 through the bearing 36b-3 and is fixed to the first arm 32. Furthermore, the output shaft 36b-2 is coupled to the shaft 36a-1 of the motor 36a through a plurality of gears not shown, and the motor 36a is provided to the case 36b-1.

On the other hand, the second structure 42 of the torque sensor 40 is fixed to the base 31 by means of, for example, a plurality of bolts not shown. The base 31 is coupled to, for example, a cylindrical attachment 51b through a bearing 20 functioning as the supporting body, and one end of the attachment 51b is fixed to the first structure 41 of the torque sensor 40 by means of, for example, a plurality of bolts not shown.

In the configuration described above, when the speed reducer 36b is driven by the motor 36a, the first arm 32 rotates. At the same time, torque (Mz) is applied from the speed reducer 36b to the first structure 41 of the torque sensor 40. The first structure 41 is displaced in the torque (Mz) direction relatively to the second structure 42 through the bearing 20. Thereby, the torque is detected.

On the other hand, when the first to fourth arms 32 to 35 operate, and a bending moment other than the torque (Mx, My) is applied to the torque sensor 40 concomitantly with the transfer weight, distance to the load, and acting acceleration, in the bearing 20, deformation thereof is suppressed by the stiffness possessed by the outer race 21, inner race 22, and balls 23. For this reason, displacement of the first structure 41 relative to the second structure 42 of the torque sensor 40 is suppressed with respect to the bending moment other than the torque (Mx, My). Accordingly, in the torque sensor 40, output of a detection signal for the bending moment other than the torque (Mx, My) is suppressed.

By also the third embodiment, the advantage identical to the first and second embodiments can be obtained.

Fourth Embodiment

In each of the first to third embodiments, the bearing 20 functioning as the supporting device is provided. Conversely, a fourth embodiment shown in FIG. 8 is an embodiment contrived by modifying the first embodiment, and a groove 31a provided to the base 31 and plurality of balls or rollers provided in the groove 31a are used as the supporting device.

Figure 8:
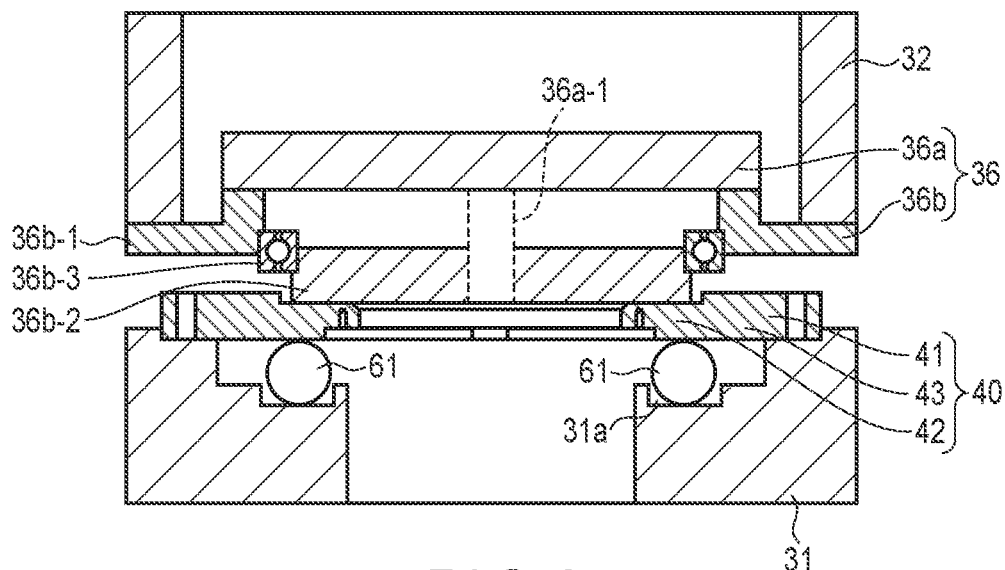
FIG. 8 is a cross-sectional view showing an example of a torque sensor supporting device according to a fourth embodiment.

In FIG. 8, the configuration of the torque sensor 40, motor 36a, speed reducer 36b, and first arm 32 is identical to the first embodiment. That is, the second structure 42 of the torque sensor 40 is fixed to the output shaft 36b-2 of the speed reducer 36b by means of bolts not shown.

On the other hand, the first structure 41 of the torque sensor 40 is fixed to the base 31 by means of a plurality of bolts not shown. An annular groove 31a is provided at a central part of the base 31 in such a manner as to correspond to the second structure 42 of the torque sensor 40, and a plurality of balls 61 serving as rotating bodies are provided in this groove 31a. For example, a steel ball having sufficient stiffness can be adopted as the ball 61, and the ball 61 is kept in contact with the second structure 42 of the torque sensor 40, and is made rotatable inside the groove 31a.

The rotating body is not limited to the ball 61, and it is also possible to adopt a roller which can be rotated inside the groove 31a and can be in contact with the second structure 42 of the torque sensor 40.

In the configuration described above, when the speed reducer 36b is driven by the motor 36a, the first arm 32 rotates. At the same time, torque (Mz) is applied from the speed reducer 36b to the second structure 42 of the torque sensor 40. The second structure 42 is displaced in the torque (Mz) direction relatively to the first structure 41. Thereby, the torque is detected.

On the other hand, when the first to fourth arms 32 to 35 operate, and a bending moment other than the torque (Mx, My) is applied to the torque sensor 40 concomitantly with the transfer weight, distance to the load, and acting acceleration, in the second structure 42 of the torque sensor 40, deformation thereof is suppressed by the stiffness possessed by the plurality of balls 61. For this reason, displacement of the second structure 42 relative to the first structure 41 of the torque sensor 40 is suppressed with respect to the bending moment other than the torque (Mx, My). Accordingly, in the torque sensor 40, output of a detection signal for the bending moment other than the torque (Mx, My) is suppressed.

By also the fourth embodiment, the advantage identical to the first to third embodiments can be obtained.

It should be noted that in the first to fourth embodiments, the bearing 20 is provided to the base 31 of the first joint J1. Although the removal effectiveness of the other-axes interferences obtained by providing the bearing 20 to the first joint J1 is great, the joint to which the bearing 20 is to be provided is not limited to the first joint J1, and the bearing 20 can also be applied to one of the second to fourth joints J2 to J4. Also in the case where the bearing 20 is applied to one of the second to fourth joints J2 to J4, it is possible to obtain the advantage identical to the case where the bearing 20 is provided to the first joint J1.

Further, the torque sensor 40 has been described with respect to the case where the torque sensor 40 is provided with the two sensor sections including the first strain sensor 44 and second strain sensor 45. However the torque sensor 40 is not limited to the case described above, and it is sufficient if the torque sensor 40 has a configuration making it possible to obtain three axis information items about Mx, My, and Mz necessary to suppress other-axes interferences. Accordingly, it is possible to apply the first to fourth embodiments to a torque sensor capable of obtaining information items about three axes or less.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A torque sensor supporting device of a torque sensor including a first structure, a second structure, third structures provided between the first structure and the second structure, and at least two sensor sections provided between the first structure and the second structure, the torque sensor supporting device comprising:
    a first mounting section provided to the first structure;
    a second mounting section which is coupled to the second structure and to which torque is applied;
    a first supporting body provided to the first mounting section;
    a second supporting body linked with the second structure; and
    a plurality of rotating bodies provided between the first supporting body and the second supporting body.

2. A torque sensor supporting device of a torque sensor including a first structure, a second structure, third structures provided between the first structure and the second structure, and at least two sensor sections provided between the first structure and the second structure, the torque sensor supporting device comprising:
    a first mounting section provided to the second structure;
    a second mounting section which is provided to the first structure and to which torque is applied;
    a first supporting body provided to the first mounting section;
    a second supporting body coupled to the second mounting section; and
    a plurality of rotating bodies provided between the first supporting body and the second supporting body.

3. A torque sensor supporting device of a torque sensor including a first structure, a second structure, third structures provided between the first structure and the second structure, and at least two sensor sections provided between the first structure and the second structure, the torque sensor supporting device comprising:
    a first mounting section provided to the first structure;
    a second mounting section coupled to the second structure;
    a groove provided at a position of the first mounting section corresponding to the second structure; and
    a plurality of rotating bodies provided inside the groove and being in contact with the second structure.

4. The torque sensor supporting device of any one of claim 1, wherein the second mounting section includes a drive unit.

5. The torque sensor supporting device of claim 1, wherein
    the second mounting section, the first supporting body, the second supporting body, and the rotating bodies are provided on the first surface side of the torque sensor, and the second supporting body is provided to the second mounting section.

6. The torque sensor supporting device of claim 1, wherein
    the second mounting section is provided on the first surface side of the torque sensor, the first supporting body, the second supporting body, and the rotating bodies are provided on the second surface side of the torque sensor opposite to the first surface, and the supporting device further comprises a fourth supporting body provided between the second supporting body and the second structure.

7. The torque sensor supporting device of any one of claim 1, wherein
    the rotating body is one a ball and a roller.

8. The torque sensor supporting device of claim 1, wherein
    the torque sensor supporting device including the first supporting body, the second supporting body, and the plurality of rotating bodies is a rolling bearing.

9. The torque sensor supporting device of claim 2, wherein the torque sensor supporting device including the first supporting body, the second supporting body, and the plurality of rotating bodies is a rolling bearing.

10. The torque sensor supporting device of claim 7, wherein
a material for the rotating body is a material containing iron.

11. The torque sensor supporting device of claim 7, wherein
a material for the rotating body is ceramic.

12. The torque sensor supporting device of claim 7, wherein
the number of the rotating bodies is greater than or equal to four, and the rotating bodies are arranged at equal intervals.

13. The torque sensor supporting device of claim 7, wherein
the rotating bodies are arranged on radii of the same length.

14. The torque sensor supporting device of claim 7, wherein
when the number of the rotating bodies is four, the rotating bodies are arranged at positions of 45°, 135°, 225°, and 315° with one of the sensor sections set as the criterion.

15. The torque sensor supporting device of claim 1, wherein
the stiffness of the supporting device including the first supporting body, the second supporting body, and the rotating bodies is greater than or equal to the third structures.

16. The torque sensor supporting device of claim 2, wherein
the stiffness of the supporting device including the first supporting body, the second supporting body, and the rotating bodies is greater than or equal to the third structures.

* * * * *